United States Patent [19]
Takahashi et al.

[11] Patent Number: 5,638,093
[45] Date of Patent: Jun. 10, 1997

[54] TOUCH PANEL INPUT DEVICE AND CONTROL METHOD THEREOF

[75] Inventors: Eizo Takahashi; Chiharu Kaburagi, both of Suwa, Japan

[73] Assignee: Seiko Epson Corporation, Tokyo, Japan

[21] Appl. No.: 350,596

[22] Filed: Dec. 6, 1994

[30] Foreign Application Priority Data

| Dec. 7, 1993 | [JP] | Japan | 5-306834 |
| May 23, 1994 | [JP] | Japan | 6-108690 |

[51] Int. Cl.$^6$ ............................. G09G 3/02
[52] U.S. Cl. .................. 345/173; 345/177; 345/179; 178/18
[58] Field of Search ............... 345/173, 177, 345/179; 178/18

[56] References Cited

U.S. PATENT DOCUMENTS

| Re. 33,151 | 1/1990 | Adler | 340/712 |
| 4,644,100 | 2/1987 | Brenner et al. | 178/18 |
| 4,700,176 | 10/1987 | Adler | 340/365 |
| 4,746,914 | 5/1988 | Adler | 340/712 |
| 4,791,416 | 12/1988 | Adler | 340/712 |
| 4,859,996 | 8/1989 | Adler et al. | 340/712 |
| 4,880,665 | 11/1989 | Adler et al. | 427/126.3 |
| 5,144,594 | 9/1992 | Gilchrist | 367/129 |
| 5,177,327 | 1/1993 | Knowles | 178/18 |
| 5,247,137 | 9/1993 | Epperson | 178/18 |
| 5,260,521 | 11/1993 | Knowles | 178/18 |
| 5,272,470 | 12/1993 | Zetts | 345/173 |
| 5,329,070 | 7/1994 | Knowles | 178/18 |
| 5,334,805 | 8/1994 | Knowles et al. | 178/18 |
| 5,380,959 | 1/1995 | Knowles | 178/18 |
| 5,401,916 | 3/1995 | Crooks | 178/18 |
| 5,402,151 | 3/1995 | Duwaer | 345/173 |
| 5,404,458 | 4/1995 | Zetts | 395/275 |
| 5,434,371 | 7/1995 | Brooks | 178/18 |
| 5,534,893 | 7/1996 | Hansen, Jr. et al. | 345/179 |

FOREIGN PATENT DOCUMENTS

| 239322 | 10/1986 | Japan. |
| 1073414 | 9/1987 | Japan. |
| 92/09058 | 5/1992 | WIPO. |

Primary Examiner—Mark R. Powell
Assistant Examiner—Vincent E. Kovalick
Attorney, Agent, or Firm—Eric B. Janofsky; W. Glen Johnson

[57] ABSTRACT

A touch panel input device is provide with a panel capable of propagating surface acoustic waves and in which surface acoustic wave attenuation is caused by a object in contact with said panel. An emission circuit outputs a surface acoustic wave drive; and an emission transducer emits surface acoustic waves in the panel in accordance with the surface wave drive outputted from said emission circuit. A reception transducer receives surface acoustic waves in the panel and outputs a received acoustic signal. A reception circuit receives the received acoustic wave signal from the reception transducer to detect a position at which the received acoustic wave is attenuated as indicative of a position that the object contacts the panel. A controller controls the emission circuit and the reception circuit, and comprises a processor for computing a width of the contact by the object on the panel in accordance with a waveform detected by the reception circuit. A judging circuit distinguishes a type of object in contact based on the width obtained by the processor.

41 Claims, 12 Drawing Sheets

TOUCH PANEL INPUT DEVICE AND CONTROL METHOD THEREOF

BACKGROUND OF THE INVENTION

1. Field of the Invention

This invention relates generally to a contact-type panel input device. More particularly, the present invention relates to touch panel input devices for which materials high in vibration-absorption characteristics, such as, for example fingers and felt-tipped pens, are utilized for input.

2. Description of the Related Art

Touch panels utilized as input devices in conjunction with materials high in vibration-absorption for input are known. Such high vibration absorption materials include fingers, felt-tip pens and the like.

An example of the touch panel device is an ultrasonic wave touch panel, such as that described in the publication of unexamined Japanese patent application No. 61-239322, a description of which is given below. Reference is now made to FIG. 14. FIG. 14 illustrates a block diagram of a of touch panel device 100. In this configuration, processor or CPU 7 controls transmission circuit 2 for electrically generating oscillation signals. The electrical oscillation signals are then converted into mechanical vibrations in the X-direction by X-direction emission transducer 22 which is located on panel 1. Similarly Y-direction transducer 20 generates vibration in the Y-direction. This results in surface acoustic waves being sent in panel 1 and reflected by reflective arrays 15, 16, 17, and 18, provided along the vertical and horizontal axes in the circumferential portions thereof. The transmitted surface acoustic waves possess rectilinear propagation characteristics and thus advance in a roughly linear manner. Some of the surface acoustic waves propagating rectilinearly are reflected 90° by being reflected by reflective element 1 of X-direction reflective element array 17 of the panel, while the remainder pass through the element. The surface acoustic waves pass through one element of array 17 receive similar treatment by the next element of X-direction reflective element array 17. In this way, the surface acoustic waves that have been reflected proceed perpendicularly to X-direction reflective element array 17 of the panel, with time differences proportional to their route differences. Surface acoustic waves possessing time differences proportional to their route differences are again reflected by X-direction reflective element array 18 and are reflected 90°. The multiple surface acoustic waves that have been reflected twice go through the same route and are received by X-direction reception transducer 23. The mechanical vibrations received by X-direction reception transducer 23 in this way are converted to electrical signals and are then sent to receiving circuit 3. The received signals are amplified by amplifier 4 and are detected by wave detector 5. In this way, the electrical signals output by X-direction reception transducer 23 are converted to a waveform shown in a solid line in FIG. 13. This waveform is quantized by analog-to-digital (A/D) converter 6 and is stored in RAM 9.

FIG. 4 shows an example of a waveform received when no touch input is being received. In the figure, the horizontal axis shows time, and the output of A/D converter 6 has the distribution as shown. As shown in FIG. 13, because the time taken by individual signals differs depending on the length of the route a signal takes after being output by the emission section and before being received by the reception transducer. FIG. 5 shows a received waveform received when a touch input is being received. Because the surface acoustic waves passing through the spot of the panel touched are attenuated due to absorption by the object that touched the panel, the level of the receive signal that corresponds to the route passing through the spot at that time will be smaller. It is possible to determine the position at which the panel was touched, by storing the signal received when no touch input is being received in RAM 9, and comparing it to the signal received when a touch input is being received. The position at which the panel was touched is the point at which the magnitude of attenuation becomes the largest, i.e. using a peak detection method. Therefore, to accurately determine this position, either the sampling interval can be shortened, or zero-cross can be detected by differentiating the waveform received. The above explanation concerns positional detection in the X direction. By performing similar detection in the Y direction, it is possible to determine the X and Y coordinates of the position at which the panel was touched. Here, the basic resolution of a touch panel greatly depends on the sampling interval, and can be expressed using the equation shown below, where t is the sampling interval and V is the propagation velocity.

$$\text{Resolution} = t \cdot V/2 \qquad \text{Equation 1}$$

Furthermore, taking into account sampling errors, actual resolution can be expressed using the equation shown below.

$$\text{Resolution} = t \cdot V \qquad \text{Equation 2}$$

Moreover, in some methods, surface acoustic wave attenuation corresponding to the positions detected in the X and Y directions is treated as the detection value in the Z direction at the touched position, and touching pressure is determined based on this detection value.

The stronger the touch pressure is the wider becomes the area of a touched spot and the more likely it becomes that the received signal does not exhibit a clear maximum attenuation value. Instead, the attenuation gets saturated and a flattened attenuation peak results. Under such conditions it is not possible to accurately determine the touch position by means of the peak detection method. Furthermore, any noise peak superimposed to the flattened attenuation peak tends to be misinterpreted as the attenuation peak leading to incorrect detection results. For the same reason, it was difficult to use a pen having a felt tip or the like as a contact object, since, due to the flat contact surface of the tip of such pen, a peak attenuation value is hardly obtained.

In a conventional position detection device there are other known problems. For example, the resolution of the touch panel is greatly affected by the sampling interval (t) used for received signals and overlapping noise. FIG. 13 shows the relationship between the variation in the detected position and the attenuation waveform significantly affect such detection. This figure shows the difference between the waveform when the panel is not being touched and that when the panel is being touched, for a case in which there is a sufficient quantity of noise. Curves a, b, and c indicate attenuation waveforms when the width of the area touched is varied. In FIG. 13, the broken lines indicate the variation in the attenuation waveform caused by noise, and the bold lines indicate the width of the variation in the detected positions when the peak detection method is used to detect the touched positions. If resolution is defined as the variation in the detected positions, the length of the bold lines indicate resolution. As can be seen in FIG. 13, when the peak detection method is used for position detection, the peak value becomes saturated when the width of the area touched is wide, as indicated by a, resulting in inferior resolution. Furthermore, a sharp attenuation waveform cannot be obtained even when the width of the area touched is narrow, as indicated by b, again resulting in inferior resolution. As can be seen, a problem exists in methods that regard the peak position as the touched position, i.e., the touched position cannot be accurately determined. Furthermore, if noise elements exist in the received signal waveform, resolution cannot be improved even if sampling interval t is shortened. The document U.S. Pat. No. 4,700,176 mentioned above discusses an alternative way of detecting the touch position from the signal received from the output transducer. In this case the detected (rectified) signal from wave detector is differentiated and the zero-crossing of the differentiated signal is detected as corresponding to the touched position. As mentioned in the document itself, this detection method is vulnerable to interpreting noise components in the signal as a "touch". Thus, this detection method is no more reliable than the peak detection method.

The conventional touch panel input devices are intended to be used as "pointing devices", i.e., it is detected, for instance, whether, and if so which, one of plural points offered for selection by a computer display screen disposed behind the panel has been touched, for instance by a finger. While for this purpose ("finger input" or "pointing input") the accuracy in position detection achieved by the methods explained above may be sufficient, it is not sufficient where the touch panel input device is to be used for "pen input" ("line input"), i.e. for drawing characters, symbols or graphic figures. In this case lines of contiguous points on the panel are touched by moving a contacting object on the panel surface. In this case the touch pressure will hardly be constant and the width of the touched positions will fluctuate correspondingly. As will be understood from the foregoing, this fluctuating touch width affects the accuracy of position detection. On the other hand, where for instance a character is drawn on the panel the shape and position of lines making up the character must be exactly detected to allow data to be derived from the panel that are suitable for being processed by an information processing device for display of the character on a screen or printing it by means of a printer. In other words, "pen input", as defined herein, to a touch panel input device requires a much higher accuracy of position detection than just "finger input".

OBJECTS OF THE INVENTION

It is an object of the present invention to overcome the aforementioned problems associated conventional touch panels.

It is a further object of the present invention to provide a touch panel that can accurately, reliably and stably utilize a pen input, in addition to a finger input.

It is an additional object of the present invention to provide a touch panel which can detect width changes of an input device so as the change modes of operation thereof.

It is also an object of the present invention to provide a touch panel which is less susceptible to the effects of noise.

It is yet further the object of the present invention to provide a touch panel which has a higher resolution for a given sampling period than in conventional devices.

It is yet an additional object of the present invention to provide a touch panel which employs a pen having a relatively low attenuation amplitude.

SUMMARY OF THE INVENTION

According to an aspect of the present invention, a touch panel device is provided using a pen that accommodates a quick-drying liquid ink. The liquid ink is momentarily placed on the panel, which causes the attenuation of the surface acoustic waves passing over the panel. The surface acoustic waves that pass over the panel are attenuated by a soft material that touches the panel, as well as by this liquid. Because of the attenuation of the surface acoustic waves passing through the spot where the liquid ink is adhered, the waveform obtained by a receiver circuit will show attenuation in the position that corresponds to the point at which the liquid ink was placed. When the pen is subsequently moved, the liquid ink that was previously adhered to the panel dries and evaporates, and thus no longer causes attenuation of the surface acoustic waves passing over the panel. When a colored quick-drying ink is used, the pigments adhere to the panel surface. However, because they are thin, and the grain size of the pigment itself is small, attenuation of surface acoustic waves is not observed. Use of the ink reduces or avoids large fluctuations of the touch width. In this way, a stable pen input can be obtained using a pen based on a quick-drying liquid ink.

Next, the degree of attenuation can be determined by obtaining the difference between the attenuation waveform shown in FIG. 5 and the waveform received when the panel is not being touched, as shown in FIG. 4. FIG. 5 shows the waveform that is obtained by normalizing the degree of attenuation, using the waveform received when the panel is not being touched, as shown in FIG. 4. By setting a certain threshold level against the waveform in FIG. 5, it is possible to determine the width where the waveform crosses the threshold level.

Through such an operation, the width of the area touched can be stably and accurately determined. By configuring the detecting means, it becomes possible to detect the width of the area touched and to change operation modes accordingly, e.g., making width W1 correspond to an input mode, and width W2 to a deletion or erasure mode.

Therefore, if widths W1 and W2 are set as the input and deletion modes, respectively, when letters or pictures are drawn on the panel using a pen possessing width W1, their traces can be sent as data into the touch panel input device, or to an external device in which they can be stored. Next, when a pen possessing width W2 (a means of deletion) is used to touch the area where the traces described above are located, the touch panel input device of the invention recognizes that the width is W2, and deletes the data that existed within that width. Furthermore, if trace data exists in an external device, the touch panel input device of the invention deletes it by sending the data on the position and width of the trace to the external device. By detecting the touched width in this way, it is possible to change operation modes of the equipment.

The position detection means of the invention is equipped with a digitizing means, such as an A/D converter, which converts electrical signals into a data sequence possessing a certain time interval; and outputs a differential waveform by comparing a reference waveform of the electrical signal that is present when no contact object exists (which is stored in the first storage means) by a waveform comparison means with the waveform of the electrical signal that is present when position detection is being performed (which may be stored in the second storage means). This differential waveform is then compared with a specified threshold level by a threshold level comparison means. A waveform correction means obtains an approximation curve, using the two data points within the data sequence that are the closest to the threshold level, and another data point that is adjacent to the data point closest to the threshold level, possessing the smaller difference from the threshold level. A position calculation means determines the position of the contact object using the mid-point between the two intersections of this approximation curve and the threshold level.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein similar reference numbers refer to similar parts.

DESCRIPTION OF THE PREFERRED EMBODIMENTS

Reference is now made to the accompanying figures.

First Embodiment

Figure 1:
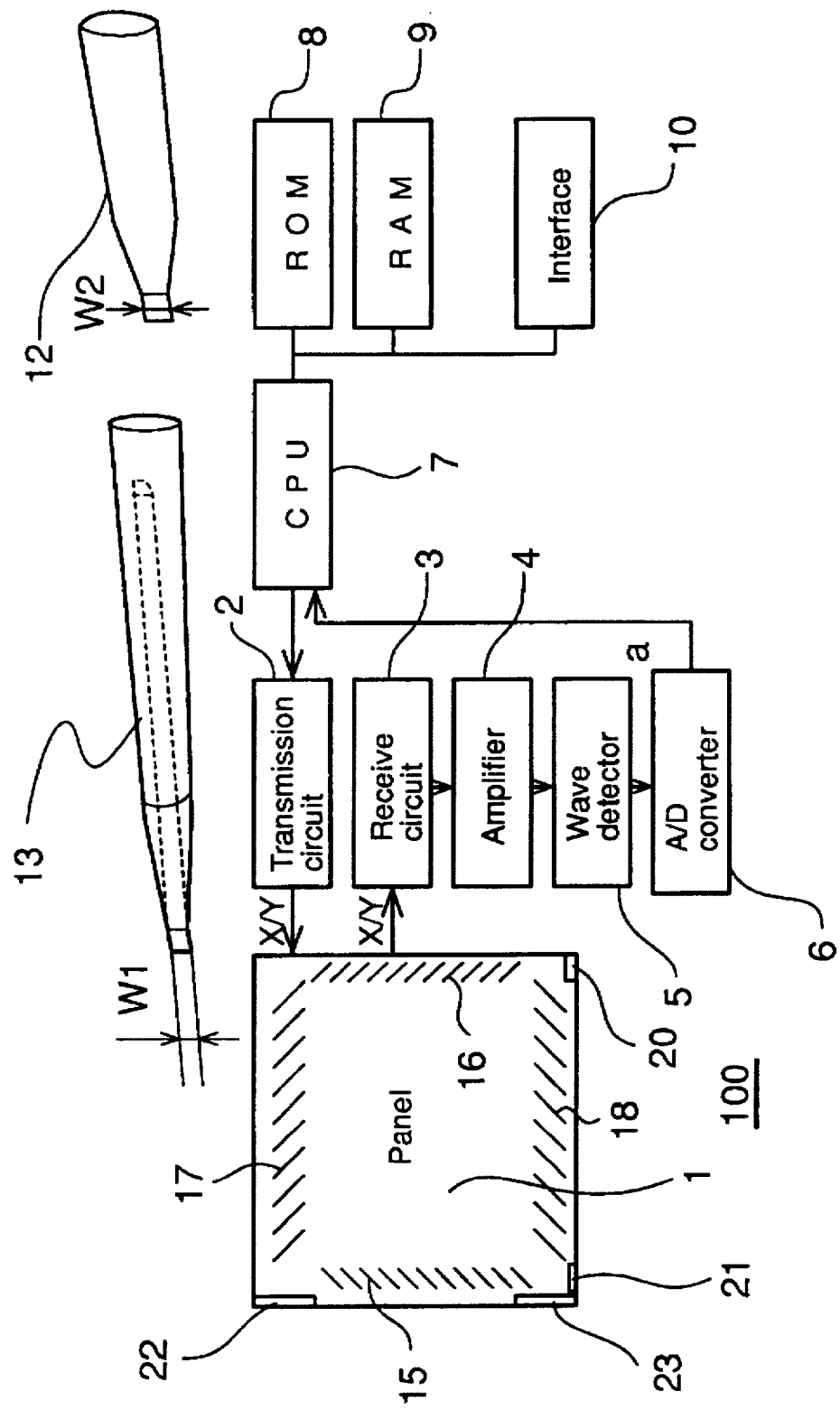
FIG. 1 is a block diagram depicting a first embodiment of a touch panel device of the present invention.
Figure 14:
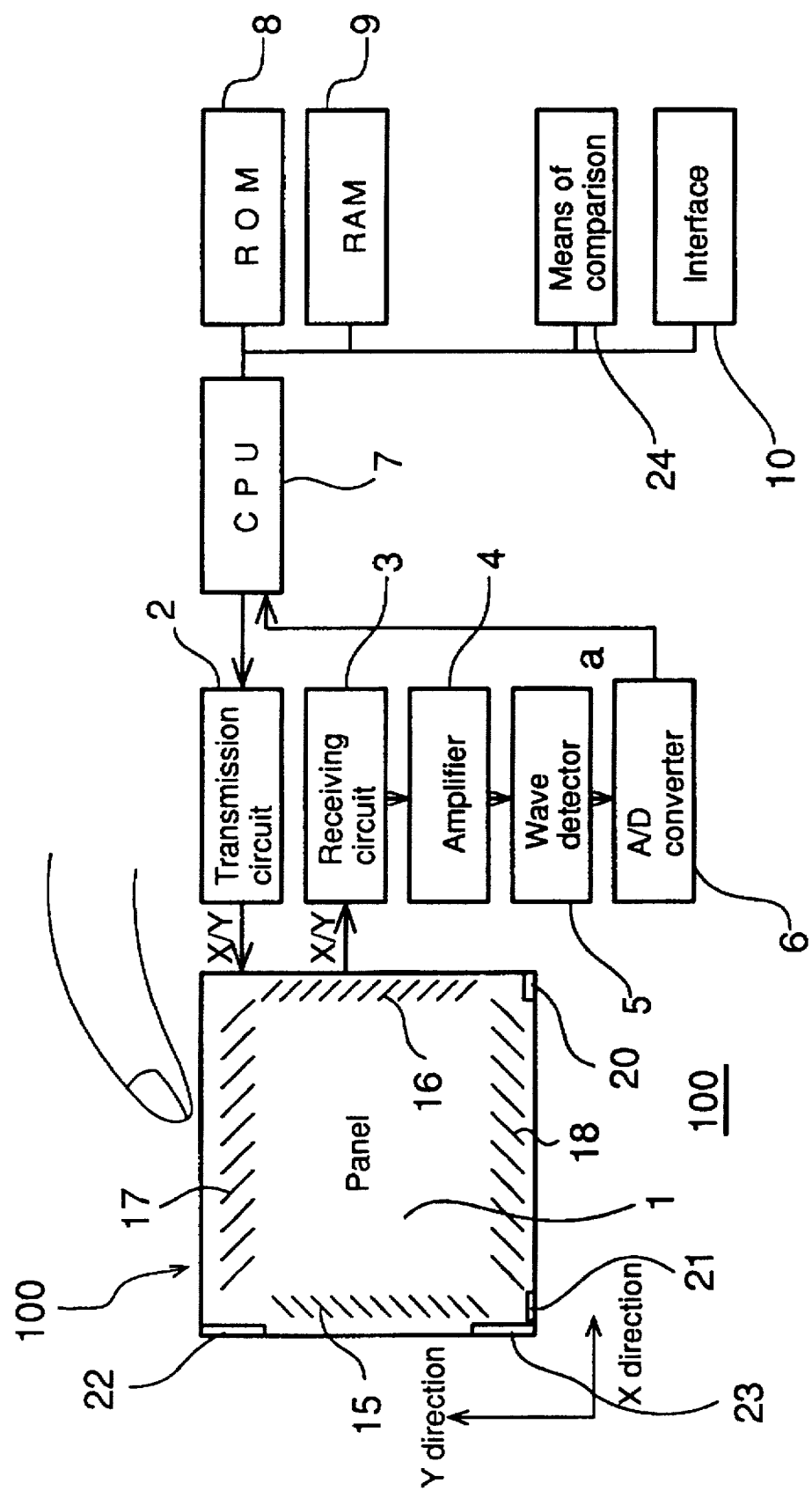
FIG. 14 is a conventional touch panel input device.

FIG. 1 depicts a block diagram of the touch panel input device 100 in accordance with the first embodiment of the present invention. At the block diagram level, the touch panel input device of FIG. 1 appears to be somewhat similar to the conventional touch panel device shown in FIG. 14. As such, like numerals represent designate similar components and detailed explanations thereof will be omitted. A detailed explanation of FIG. 1 now follows.

In FIG. 1, CPU 7 controls the processing of touch panel input device 100 in accordance with preprogrammed instructions stored in ROM 8. A transmission circuit 2 generates electrical oscillation signals for conversion to surface acoustic wave bursts in the X direction by transducer 22 and the Y direction by transducer 20. Transducers 20, 22 are mounted on side surfaces of touch panel 1 as shown in the figure. These acoustic wave bursts are reflected, in a similar manner as those in FIG. 14, by reflective arrays 17, 18 and 15, 16. More specifically, the acoustic wave bursts generated in the X direction by transducer 22 are reflected 90° by reflective array 17. Those acoustic wave bursts are then reflected another 90° in the direction of transducer 23. Transducer 23 converts the received acoustic wave bursts into electrical signal for processing by receiver 3. The Y direction operates in a similar manner as that of the X direction. A discussion of which will be omitted.

The received signal is then amplified by amplifier 4 and rectified by wave detector 5. The rectified signal is digitized by digital-to-analog converter having a sampling period t. The digitized signal is then processed by CPU 7 for output to interface 10. The details of the processing will be explained hereinbelow. As will be appreciated by one of ordinary skill in the art, the functional elements represented by the various blocks in FIG. 1 may be implemented by any suitable circuitry.

Figure 4:
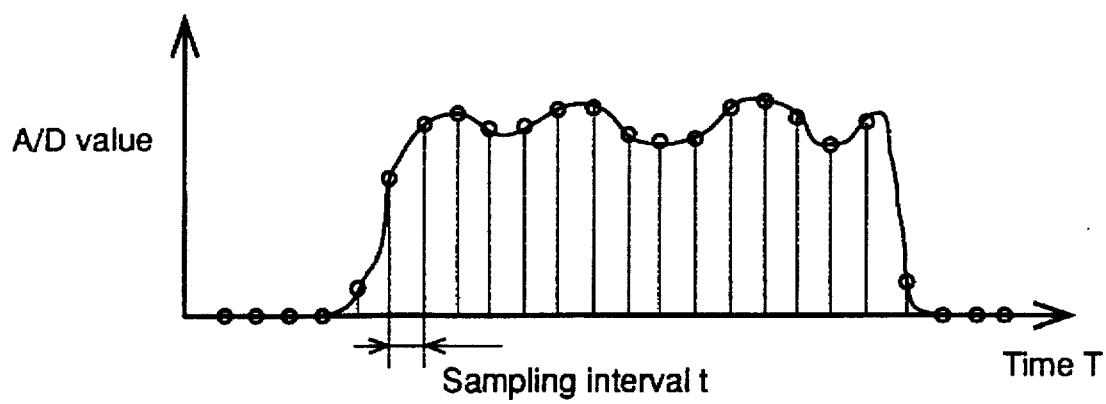
FIG. 4 is a graph showing a waveform resulting from the sampling of a received waveform when the panel is not being touched in accordance with the first embodiment of the present invention.
Figure 5:
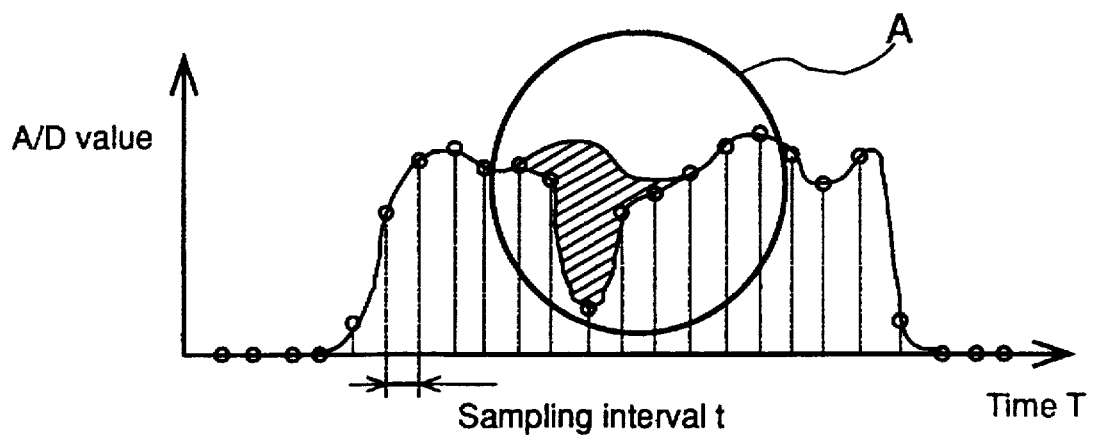
FIG. 5 is a graph showing a waveform resulting from the sampling of a received waveform when the panel is being touched in accordance with the first embodiment of the present invention.
Figure 6:
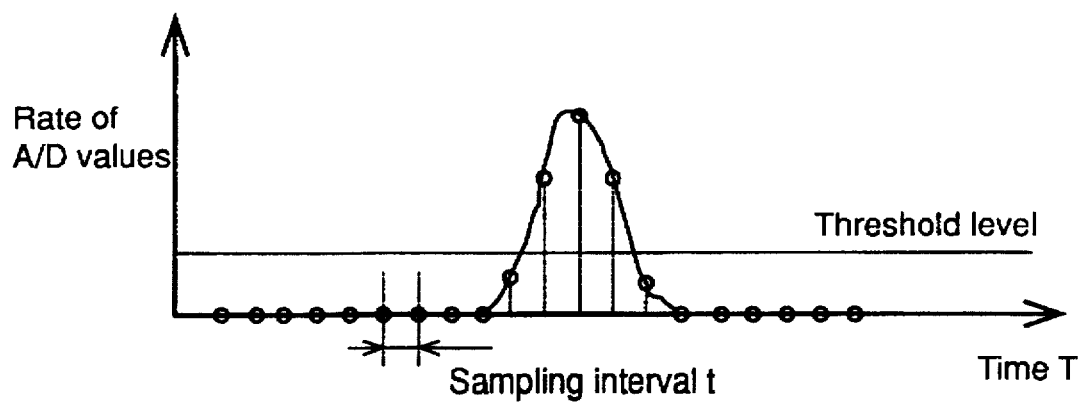
FIG. 6 is a graph showing an attenuation rate resulting from the normalization of the degree of attenuation in accordance with the first embodiment of the present invention.
Figure 15:
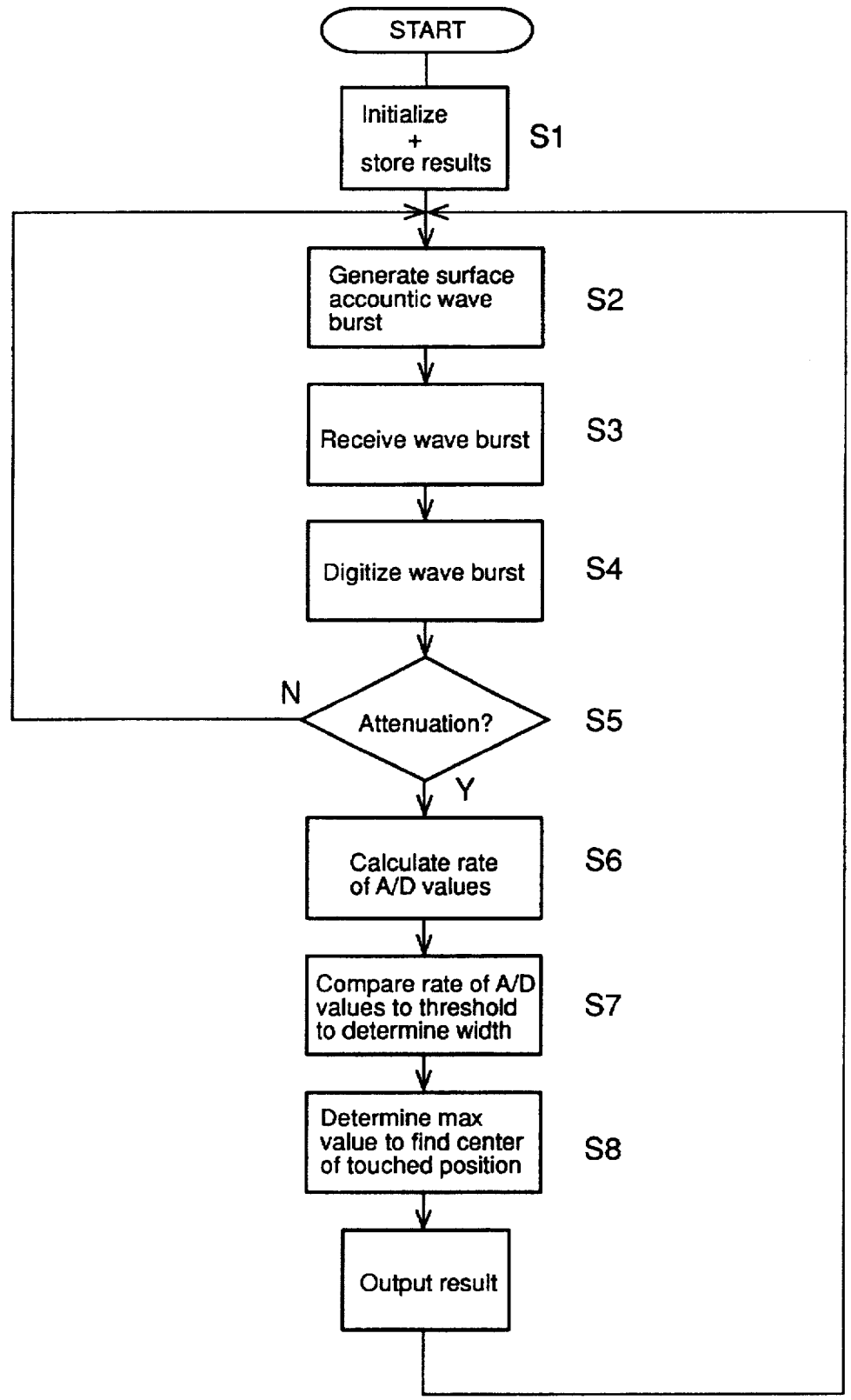
FIG. 15 is flow chart of the method according to the first embodiment of the present invention.

Reference is now made to FIGS. 1, 4–6 and 15. FIGS. 4–6 are time domain plots of the signals and FIG. 15 is a flow chart of the logical operations used to determine the position that touch panel 1 is touched and the width of the touching implement. It is noted that these logical operations are processed when touch panel 1 is touched and when not touched. The touch panel 1 is first initialize, i.e. sampling points in which the panel is not touched are stored in memory or RAM 9 (step S1). FIG. 4 shows a plot of the received signal over a time period T when the panel in not touched. As described in detail hereinabove, a surface acoustic wave burst is generated (step S2), received (step S3) and digitized (step S4). As noted above the sampling period is t. FIG. 5 is a plot of the received signal when touch panel 1 is touched. As shown in FIG. 5 the attenuation in area A is an indication that touch panel 1 has been touched (step S5). The shaded area in FIG. 5 shows the difference between the plot in FIG. 4, when panel 1 is not touched. FIG. 6 is plot of the quotient of the values of FIG. 4 divided by the values of FIG. 5 to obtain the attenuation ratio; the Y axis is the attenuation rate. The attenuation rate is compared to a predetermined threshold. The length between the points crossing threshold is the width of the attenuation width. By virtue that the attenuation width is based on a constant threshold level, it becomes possible to stably detect the touched width. In accordance with FIG. 6, the point at which the degree of attenuation is largest, or the center of gravity of the mountain-shaped point on the curve is detected as the touched position. The aforementioned steps are similarly performed in the Y direction so as to calculated the touched position and width in both the X and Y coordinates. The resultant data is the sent via interface 10 to, for example, a host device.

Next, an explanation of an example that the above system is used therein, will be provided. In this embodiment, at least two input devices are provided each having different widths. In this example an input pen and a deletion pen or eraser are used. The pens have different thicknesses on the writing tips at least one of which is made of felt or the like and soaked with a quick-drying ink or the like for enhancing the attenuation property. In this example both of the pen tips possesses different attenuation widths in the horizontal and vertical axes on the panel. One of the pens having a greater thickness, can be replaced with an eraser having an elastic tip. Assuming that the attenuation widths of the pen tips are W1 and W2 in the relation of W1<W2, the pen having attenuation width of W2 is used for an eraser 12 and the other having attenuation width of W1 a drawing pen. Firstly, the touch panel devices 100 determines whether a marking pen is or eraser 12 is used by determining the width of the touching instrument as explained above. If the device determines the width of the input implement is W1 then the touch panel is in the input mode. Alternatively, if the width is W2, then the mode is changed to deletion or erasure. When the tip is traced on the panel, a quick-drying ink of a certain width is marked on the panel 1. At the instant when pen 13 places the quick-drying ink on the panel 1, the surface acoustic waves passing through this area become attenuated. The quick-drying ink then evaporates from the panel, thus stopping the attenuation of the surface acoustic waves passing through the area. The positioning of the touched or marked areas is performed in accordance with the procedures described above. When pen 13 is used to draw a character or a graphics figure, a processor or CPU 7 detects that the width of the area touched on panel 1 is W1 and determines that the mode is the input mode. When touch input is made onto panel 1 by means of the eraser 12, the CPU 7 detects that the attenuation width on panel 1 is W2, and judges the mode is an erasing mode so that the range that was inputted by means of eraser 12 can be erased from the already inputted data. In this way, it is possible to change operation modes through the detection of the touched width. It is needless to say, that the correspondence between the attenuation widths and the thicknesses of the tips are preset in RAM 9.

Second Embodiment

Figure 2:
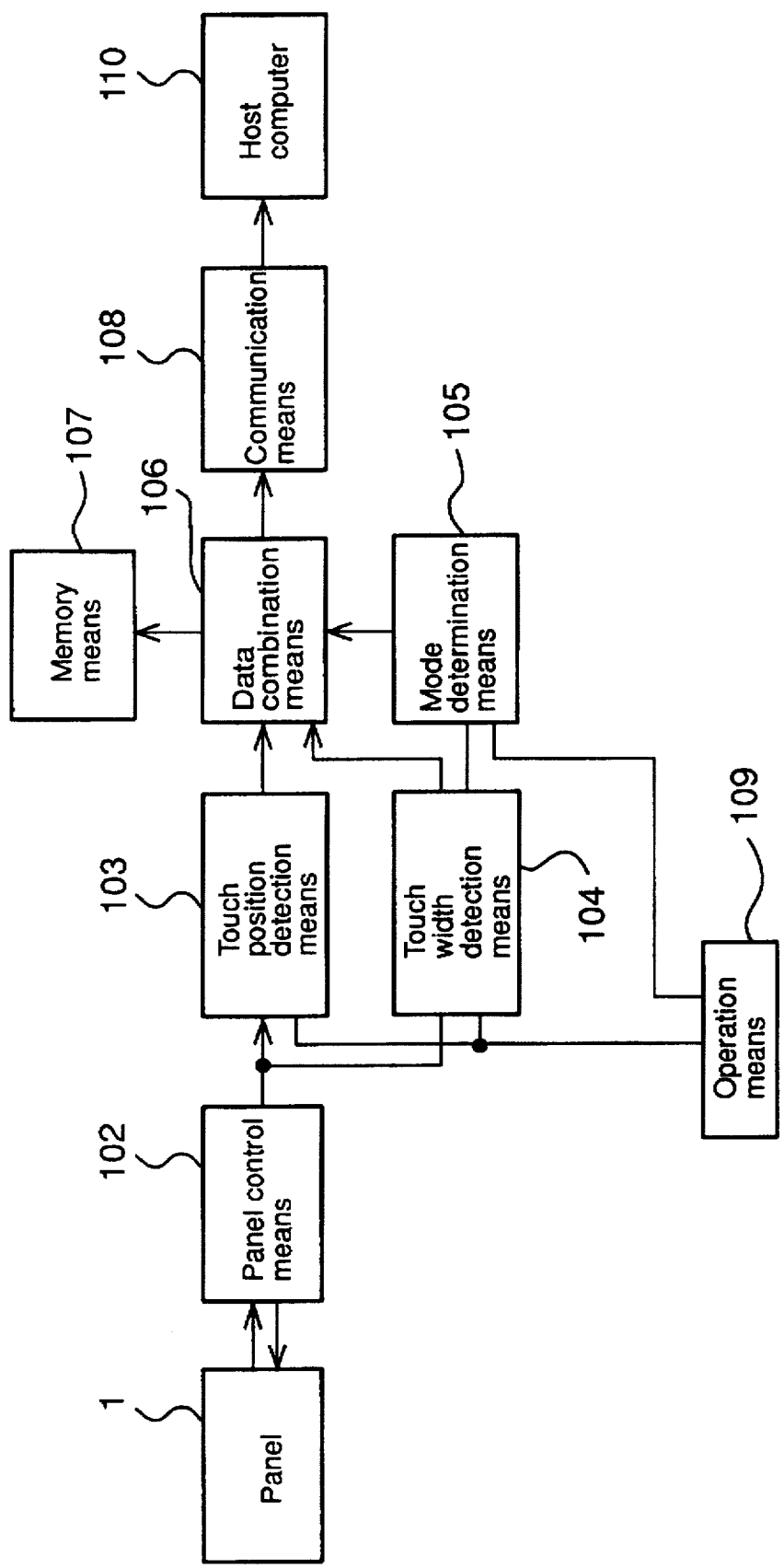
FIG. 2 is a functional block diagram of the first embodiment shown in FIG. 1.

FIG. 2 is a functional block diagram illustrating the above explained functions in accordance with a second embodiment of the present invention. Panel control means 102 inputs or outputs an acoustic wave on the panel 1. Panel control means 102 including transmission circuit 2, transducers 20, 21, 22 and 23 and receiver circuit 3. Touch position detection means 103 includes amplifier wave detector 5 and analog-to-digital converter 6. Touch width detection means 104 which detects the attenuation width of the touch implement, input mode determination means 105 which determines the input mode based on the detected data, data combination means 106 which combines the data are implemented by CPU 7. Data stored into memory means 107 is implemented as RAM 9 and outputted via interface to a host computer 110 via a communication means 108. Operation means 109 which controls the above functions of width detection means 104, position detection 103 and mode determination 105 and is also implemented by CPU 7. Of course, as will be appreciated by the skilled in the art, the functions of CPU 7 can be easily implemented by dedicated circuitry or microprocessor.

Figure 3:
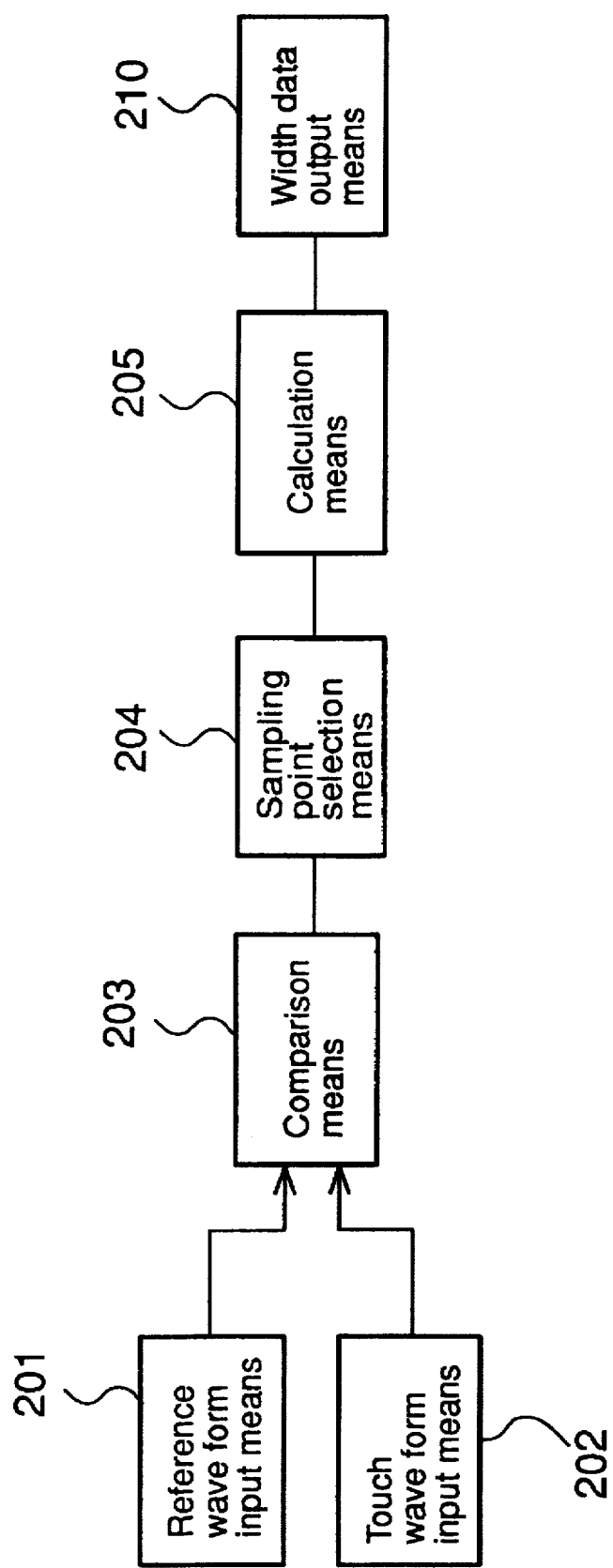
FIG. 3 is a functional block diagram of a touch width detection means of the first embodiment of FIG. 1.

Further details on the method of processing detected data are explained below. FIG. 3 shows a detailed block diagram of the width detection means 104 of touch panel input device 100. Reference waveform input means 201 obtains a reference waveform data by utilizing the input/output transducers when no touch is executing, e.g. right after a power source is switched on. The waveform signal obtained by the detection means is quantized by means of A/D converter 6 at a predetermined sampling rate, it results in the sampling points (indicated by small circles) on the curve in FIG. 4. The data that has been quantized at a predetermined sampling is stored in a prescribed area of the RAM 9. Next, to determine whether or not the panel has been touched, after the surface acoustic wave burst is sent out as described, the surface acoustic waves are received and stored in a prescribed area in the RAM 9. If the panel is touched during this operation, the received signal waveform will take the shape indicated by the solid line on the curve in FIG. 5, and will result in the sampling points on the curve after being quantized by A/D converter 6. The shaded area in the figure indicates attenuation of the surface acoustic waves caused by touching panel 1. Comparison means 203 processes the data stored in RAM 9 to obtain differentials at a predetermined time interval and normalizes the differentials using the values of the reference waveform data stored in RAM 9, thereby obtaining the attenuation rate waveform plotted using the small circles in FIG. 6. The solid lines have been drawn based on extrapolation of the empirically obtained sampling points (indicated by small circles). Sampling point selection means 204 selects sampling points for determining the width accurately from the normalized waveform by a method explained below. Calculation means 205 calculates data of crossing points of the attenuation waveform data against the threshold level line based on the values on the sampling points by a method explained below. Width data output means 210 outputs the width data to a next processing means.

Figure 7:
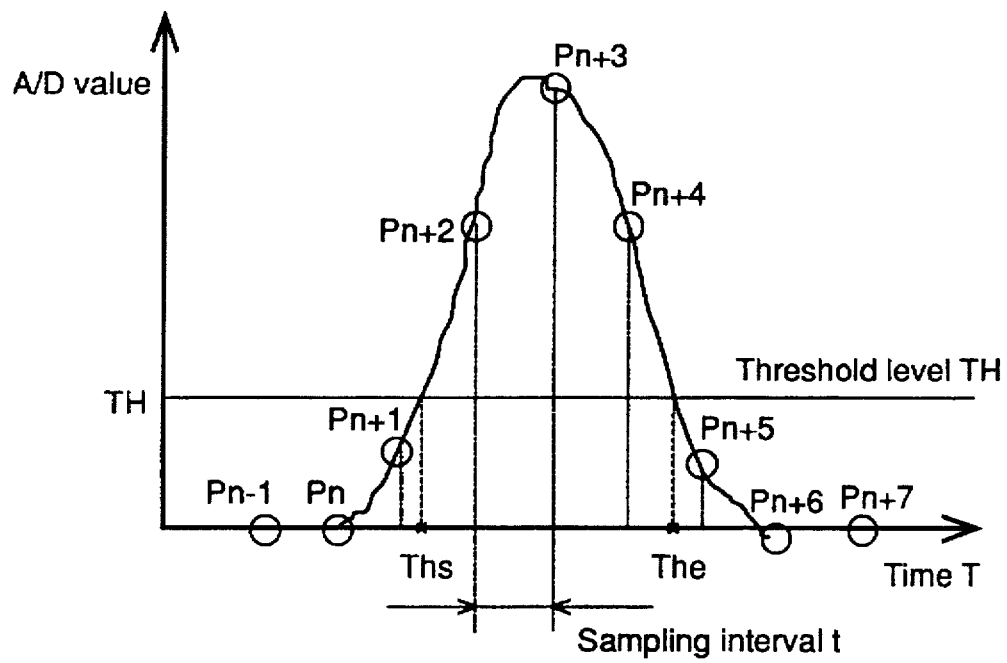
FIG. 7 is a magnified view of the waveform showing the degree of attenuation of FIG. 6.

FIG. 7 is a magnified view of the attenuation points in FIG. 6. Sampling points are denoted with a numbering convention, i.e., Pn−1, Pn, Pn+1 . . . Pn+7, to indicate attenuation points. Threshold level TH is set against these attenuation points, and if any of the sampling points are higher than TH, it can be determined that waveform attenuation has occurred and touch panel 1 has been touched. Ordinarily, threshold level TH is set to be higher than the level of noise that overlaps the received signal waveform. When an attenuation point has been detected, and it is judged that the panel has been touched, sampling point selection means 204 determines the attenuation points for processing by calculation means 205. More specifically, sampling point selection means 204 selects from the attenuation waveform shown in FIG. 7, three contiguous sampling points near threshold level TH, in the area in which the attenuation rate begins to rise. Similarly, three contiguous sampling points are selected in the area in which the attenuation rate begins to fall. For the three sampling points, two adjacent points that flank threshold level TH, and a third point adjacent to one of these two points are selected. The method of selecting this third point is explained in detail below.

Figure 8:
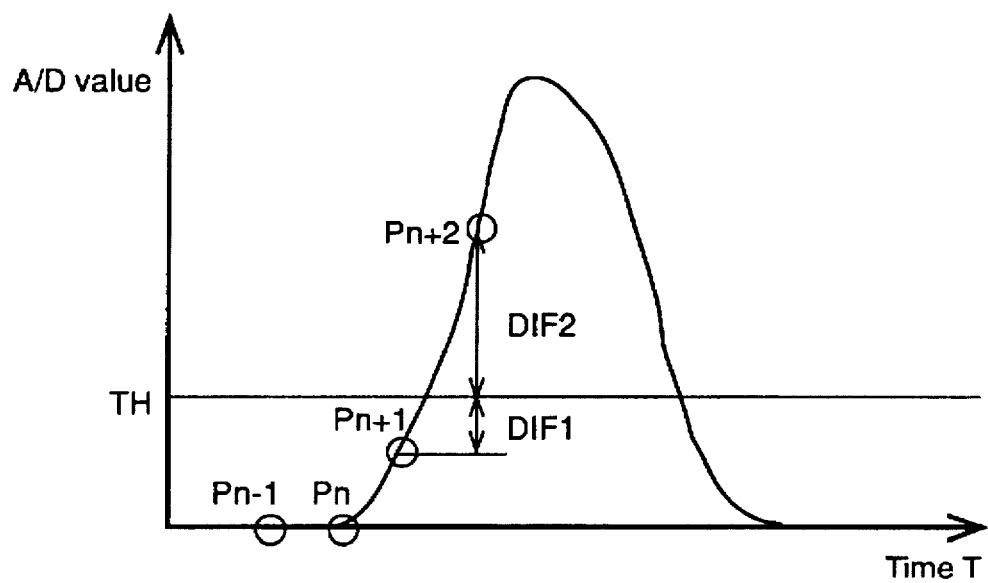
FIG. 8 is a graph depicting the locations at which the sampling points that are selected by the calculation means.

First, the calculation described below is performed on the sampling points that flank threshold level TH. FIG. 8 illustrates how the calculation is performed on the rising area of FIG. 7. Pn+1 and Pn+2, which flank the threshold level, are selected as shown in FIG. 8. Next, the following comparisons are made for the attenuation amount (A/D value) for these points.

| $DIF1=TH-A/D\ (Pn+1)$ | Equation 3 |
| $DIF2=A/D\ (Pn+2)-TH$ | Equation 4 | where A/D(Px) indicates the A/D value at sampling point Px. When DIF1>DIF2, i.e., when the A/D value of Pn+2 is closer to threshold level TH than the A/D value of Pn+1, Pn+3 which is adjacent to Pn+2 is selected as the third sampling point. Therefore, the points to be relayed to the means of calculation will be Pn+1, Pn+2, and Pn+3. Alternatively, when DIF1<DIF2, i.e., when the A/D value of Pn+1 is closer to threshold level TH than the A/D value of Pn+2, Pn which is adjacent to Pn+1 is selected as the third sampling point. Therefore, the points to be relayed to the means of calculation will be Pn, Pn+1, and Pn+2. If a sampling point matches threshold level TH, that point and the points before and after that point are relayed to means of calculation 25.

Figure 16:
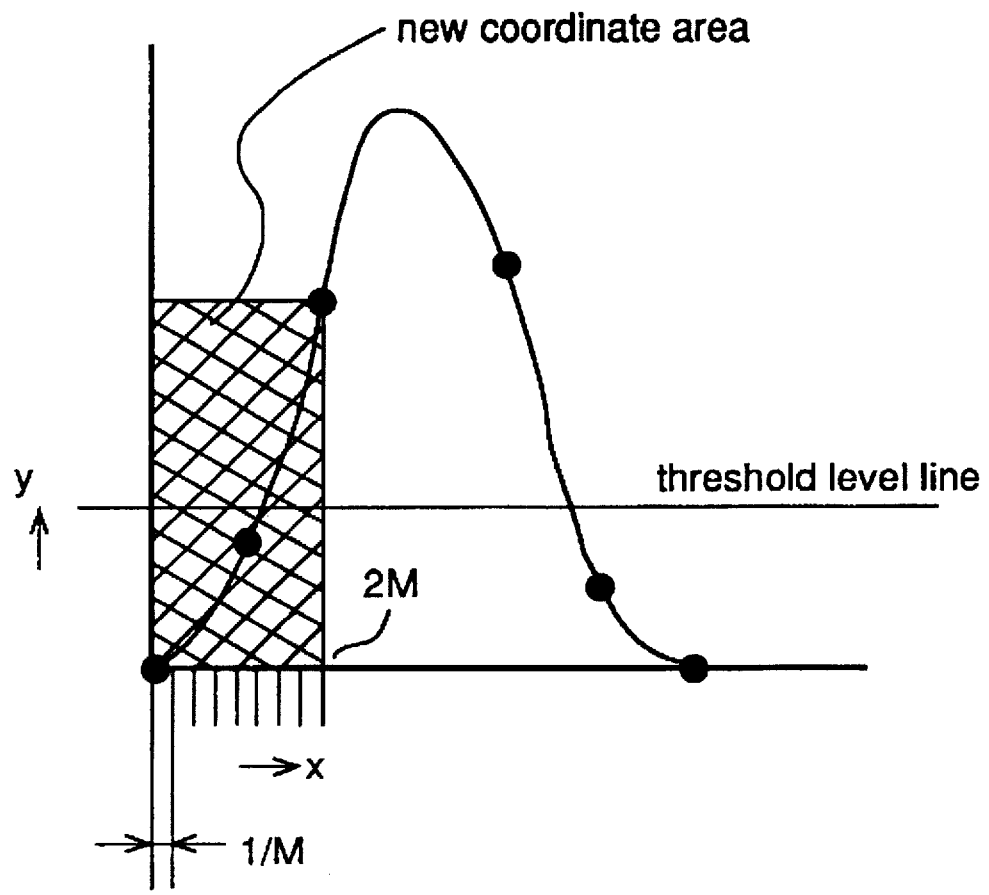
FIG. 16 is a graph showing the coordinate system according to the second embodiment of the present invention.

Similar processes are performed for the sampling points in the attenuation decreasing area. Using a total of six points, i.e., the three points in the increasing area and the three points in the decreasing area that are selected by sampling point selection 204, means of calculation 205 means computes times $Th_r$ and $Th_e$, at which the A/D values match threshold level TH in the rising and falling areas, respectively. Calculation means 205 further the total interval by 2M, into M segments of equal size, according to the required time axis resolution. In other words, a new coordinate system will be used in which 1/M is the unit, and the time that corresponds to the first sampling point is the origin of the time axis. This new coordinate system is shown in FIG. 16.

As a result, the coordinates of the three points, used for obtaining time $Th_r$ related to the increasing area, will be transformed to (0, A/D(Pn)), (M, A/D(Pn+1)), and (2M, A/D(Pn+2)). Subsequent computations will be explained in further detail using FIG. 9. When the three points indicated by black dots are selected by sampling point selection means 204 in the manner described above as shown in FIG. 9, and linear interpolation using for example, the least square approximation method is performed using these three points. The time at which the A/D value matches threshold level TH can be obtained as a number between 0 and 2M from the approximated linear function similarly time $Th_e$ is obtained by perform linear interpolation of points Pn+4, Pn+5 and Pn+6. By determining the time at which the increasing and decreasing areas of the attenuation waveform match threshold level TH, based on the linear function approximated using the least square method in the manner explained above, it is possible to obtain a time interval that is finer than sampling interval t. The mid-point between $Th_r$ and $Th_e$, determined in the above described manner, is the touched point. Thus it is possible to accurately determine the linear position in the X or Y direction of the panel. The resolution obtained in this manner can be expressed using Equation 5.

$$\text{Resolution} = t \cdot V/2M \quad \text{Equation 5}$$

By performing this operation in both the X and Y directions, it is possible to accurately determine the two-dimensional touch point on the panel. The coordinate of the touch point calculated in this manner is sent via means of interface 10 to the host or another suitable device, such as a PC.

In the preferred embodiment of the invention explained above, the attenuation width is detected and used for operation mode switching. It is to be noted that the advantage of a high accuracy of position detection such as to allow pen input may be achieved without making use of the width detection and operation mode switching. Where the attenuation width is detected it may also be used for a purpose other than operation mode switching. The position detection according to the present invention detects the center of a touch position. When a line is drawn on the touch panel by a pen the positions of contiguous points making up the line will result from the position detection. The detected attenuation width may be used to derive additional data representing the width of the line. In this way, lines of different widths can be input into an information processing system as may be required for graphic drawings. Operation mode switching and line width input may be combined by having the operation mode switching responsive to certain threshold widths. Between the threshold widths the touch width may be varied for line width input.

Further, while in the preferred embodiment of the invention signal processing is in the digital domain based on quantized samples of received analog signals, as will be appreciated by those of ordinary skill in the art, it is generally possible to implement the invention by analog signal processing not requiring sampling and quantizing. Also, while normalized attenuations are preferably used for comparison with a fixed threshold level to eliminate an influence of fluctuations of absolute amplitude values on the detection results, a similar advantage may be achieved by comparing the signal differences representing unnormalized attenuations with a threshold level adaptively adjusted in response to an average of the reference samples. An adaptively adjusted threshold level may be preferable for an analog implementation of the invention.

Figure 10A:
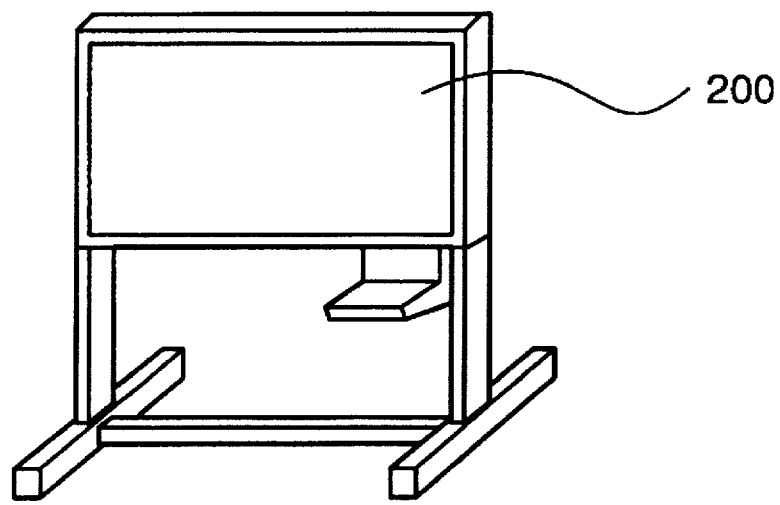
FIG. 10A is a perspective view of a second example comprising an electronic blackboard utilizing the present invention.
Figure 10B:
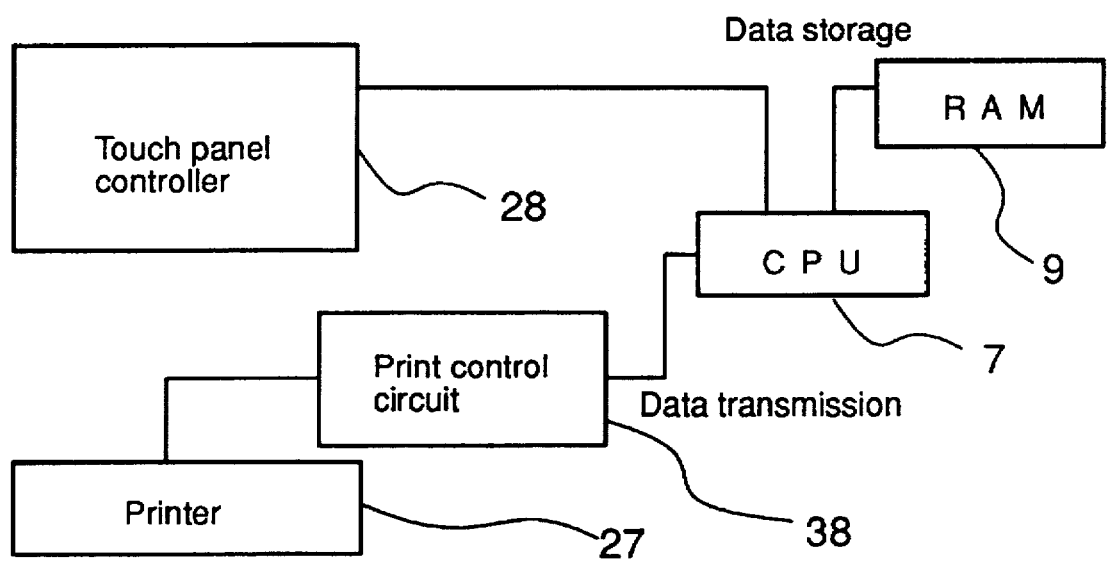
FIG. 10B is a block diagram thereof.

FIG. 10A shows an example employing the present invention. The present invention is utilized in an electronic white board 200, and FIG. 10B is a block diagram showing its internal controller. The embodiment in FIGS. 10A and 10B uses pen 13 and erase 12. Pen 13 applies a quick-drying colored liquid ink and is used to draw letters or graphic figures directly on white board 200. In the touch panel input device related to this example, the position and width of the ink adhered on white board 200 is detected by surface acoustic wave attenuation, in a manner discussed above. The resulting data is then stored.

In this way by only, using a white board with a panel, the data drawn can be visually verified by the user and can be stored as data at substantially the same time. If a mistake was made, eraser 12, which is wider than pen 13, can be used to erase the letters or graphic figures that were drawn on the white board 200. The corresponding data stored internally can be contemporaneously deleted at the same time. To copy the letters or graphic figures drawn on panel 1, a conventional electronic blackboard must use scanner 30 to read the letters or graphic figures on the panel as shown in FIG. 10. Consequently, scanner drive means 31 which moves scanner 30, and screen rotation mechanism 32 for moving the panel are required. CPU 7 transfers the data read by scanner 30 to printer controller 38, where printer mechanism 27 prints the data.

However, in the electronic blackboard of the working example of the invention shown in FIGS. 10A and 10B, the data stored in RAM 9 can be read, and thus can be directly transferred to printer controller 38 for printing by printer 27. As will be appreciated, an electronic blackboard 200 incorporating the present invention does not require scanner 30, scanner drive 31, or screen rotation mechanism 32.

Figure 9:
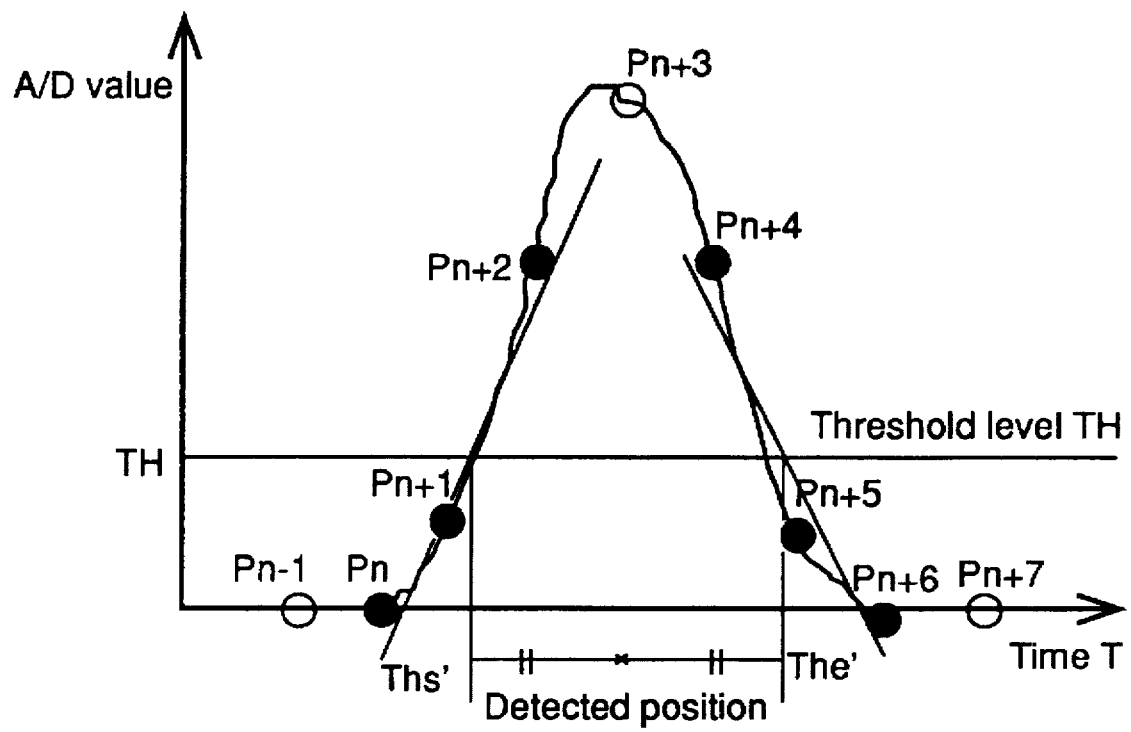
FIG. 9 is a graph showing the result of linear interpolation using the least square method, and two points flanking the point at which the attenuation waveform of FIG. 7 crosses the threshold level.
Figure 11:
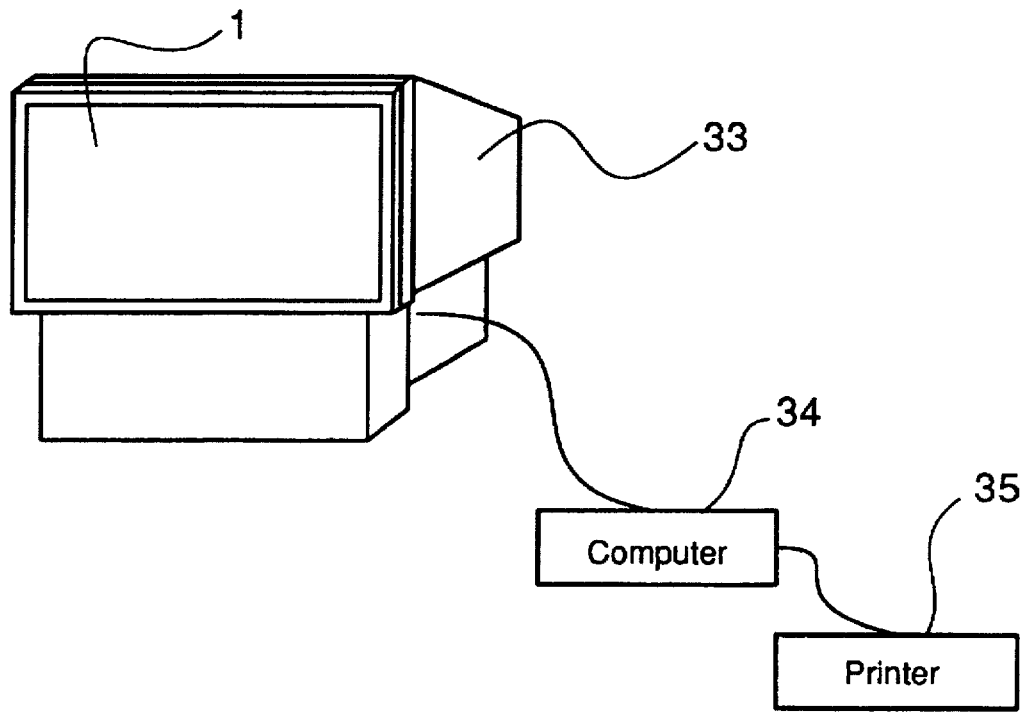
FIG. 11 is a schematic diagram of a third example of the present invention.

FIG. 11 shows a second example incorporating an embodiment of the present invention. This system comprises projector 33, in which panel 1 which is similar to that shown in FIG. 9, is installed, computer 34, and printer 35. A clear, transparent quick-drying colorless ink is used for pen 13 of this system. Since the ink is colorless, it leaves no trace on the panel. To compensate, the system uses projector 33, which is linked to computer 34. An object detected by the user is drawn by computer 34 and then drawn on the screen of projector 33 located in the back of panel 1. Thus the object is displayed as it is actually being drawn. Letters or graphic figures that are displayed can also output to printer 35.

Figure 12:
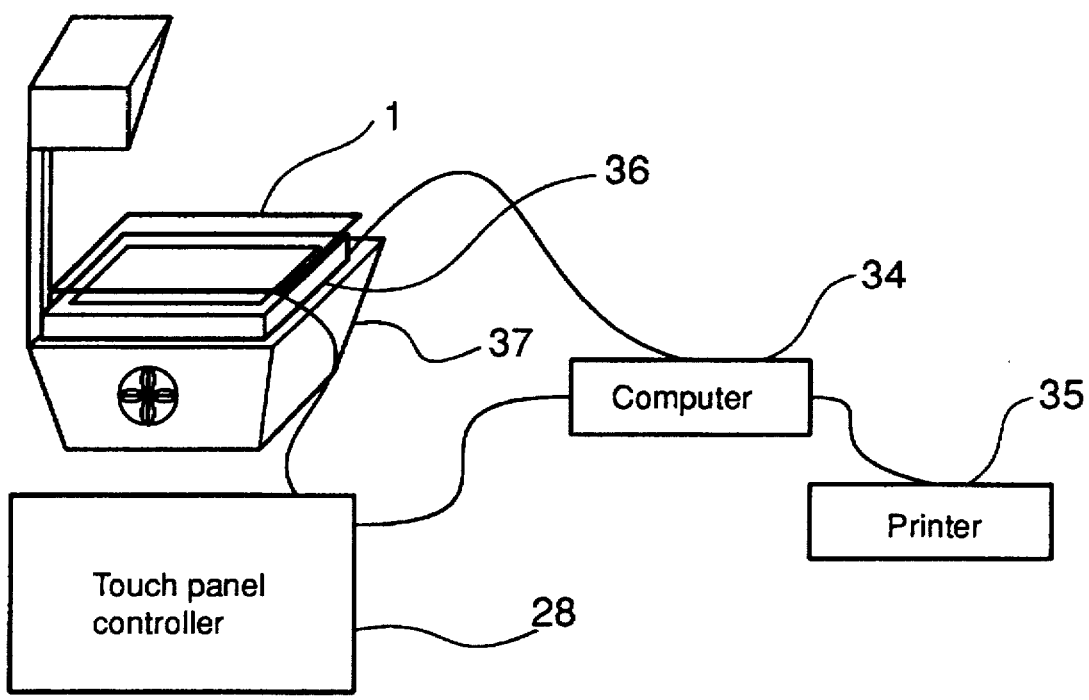
FIG. 12 is a schematic diagram of a fourth example of the present invention.
Figure 13:
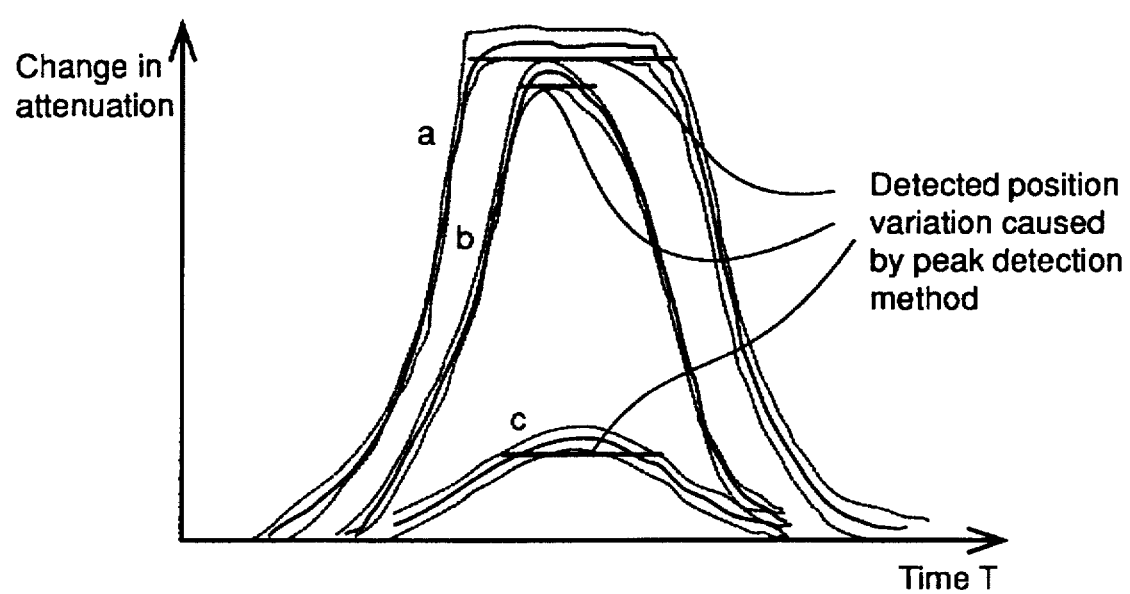
FIG. 13 is a graph showing variations in the positions detected using a conventional position detection method.

FIG. 12 shows a third example incorporating an embodiment of the present invention, in which the input device similar to that in FIG. 11 has been applied to overhead projector (OHP) 37. In FIG. 12, OHP display device 36 is placed on OHP 37, and panel 1 is placed on OHP display device 36. When making a presentation, computer 34 is used to display information on OHP display device 36, and a pen is used to write on panel 1. It is also possible to have computer 34 read the area to which comments have been added. This result is displayed over the information displayed on OHP display device 36, and is also output to printer 35.

As explained above, by using a pen containing a quick-drying liquid ink, the invention enables pen input in addition to finger input for touch panels based on the surface acoustic wave method. Furthermore, the invention possesses an advantage in that it enables changes in operation mode, based on touch width detection, such as, for example, input and erasure or deletion modes. Through the use of pointing devices, i.e., an input pen and an eraser, the simple operations of drawing and deletion become direct computer input, thus improving user interface. For devices based on the invention, the only modification that might be required would be a change in the width of the pen, even for those devices in which multiple status's need to be specified. Furthermore, there is no need for modifications, such as circuit addition to the device main unit.

Furthermore, by reducing the effects of noise and sampling errors, the invention makes it possible to obtain resolution that is higher than that obtained from sampling interval. Additionally, the invention enables pen input for surface acoustic wave-type touch panel input devices, and eliminates the need for the increases in the capacity of the means of storage, that would be required when shortening sampling intervals in order to improve resolution.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A touch panel input device comprising:
    a panel capable of propagating surface acoustic waves and in which surface acoustic wave attenuation is caused by an object in contact with said panel;
    emission circuit means for outputting a surface acoustic wave drive;
    an emission transducer for emitting surface acoustic waves in said panel in accordance with the surface wave drive outputted from said emission circuit means;
    a reception transducer for receiving surface acoustic waves in said panel and for outputting a received acoustic wave signal; and
    reception circuit means for receiving the received acoustic wave signal from said reception transducer to detect a position at which the received acoustic wave is attenuated as indicative of a position that the object contacts said panel; and
    controller means for controlling said emission circuit and said reception circuit means comprising:
    computing means for computing a width of the contact by the object on said panel in accordance with a waveform detected by said reception circuit means, and
    judging means for distinguishing a type of object in contact based on the width obtained by said computing means.

2. The touch panel input device according to claim 1, wherein the object comprises at least first and second touch pens each having a respective contact tip having a thickness, the first thickness being different from the second thickness.

3. The touch panel input device according to claim 2, wherein one of said touch pens has a contact tip made of porous member that accommodates one of a clear and colored quick-drying liquid ink.

4. A touch panel input device according to claim 1 further comprising detection mode determination means for executing a respective operation in accordance with the type of object judged by said judging.

5. A touch panel input device comprising:
    a panel on which acoustic waves are propagated;
    a surface acoustic wave generation means having an emission transducer for generating surface acoustic waves;
    a plurality of surface acoustic wave reflective arrays provided along the vertical and horizontal axes in circumferential portions on said panel for reflecting at least portions of the surface acoustic waves;
    touch detection means having a reception transducer for receiving the surface acoustic waves and for converting multiple surface acoustic waves that have been reflected by said plurality of reflection arrays into an electrical signal,
    wherein said touch detection means comprises a waveform comparison means for outputting a differential waveform by comparing a waveform of the electrical signal at a time when the contact object is out of contact with said panel, with a waveform of said electrical signal at a time when the object is in contact with said panel;
    threshold level comparison means for comparing the differential waveform with a predetermined threshold level;
    waveform correction means obtaining a corrected waveform by correcting a portion of the differential waveform in proximity of the threshold level;
    position calculation means for calculating a position that the object is in contact with said panel; and
    width calculation means for calculating a width of the object of the touched position on said panel in accordance of two intersections of the corrected waveform and the threshold level.

6. The touch panel input device according to claim 5, wherein said detection means comprise sampling means for converting the electrical signal into a data sequence having a certain time interval.

7. The touch panel input device according to claim 6, wherein said sampling means comprises an analog-to-digital converter.

8. The touch panel input devices according to claim 5, wherein said waveform correction comprising an approximation curve generation means producing an approximation curve, using two data points of the differential waveform are closest to the threshold level, and other one data point which is adjacent to the two data points.

9. The touch panel input device according to claim 8, wherein the other data points are adjacent to the data points closest to the threshold level, and possess a smallest difference from the threshold level.

10. The touch panel input devices according to claims 4 wherein said position calculation means determining a midpoint between two intersections of said corrected waveform and said threshold level as the contact position of the object on said panel.

11. A control method for a touch panel input device having a panel on which an acoustic wave is propagated comprising the steps of:

generating surface acoustic waves;

forming reflective arrays along vertical and horizontal axes in circumferential portions on the panel for reflecting at least part of the surface acoustic waves;

receiving the surface acoustic waves and converting the received surface waves into an electrical signal;

providing a reference electrical signal indicative of the object not in contact with the panel;

calculating a differential waveform by comparing the waveform of the electrical signal when the object is in contact, with the reference electrical signal;

comparing a threshold level comparison with the differential waveform;

forming a corrected waveform by correcting a part of the differential waveform that is near the threshold level; and calculating a position of contact of the object in accordance with two intersections of the corrected waveform and the threshold level.

12. A control method for a touch panel input device according to claim 11, wherein said comparison step comprises step of sampling for converting the electrical signal into a data sequence having a predetermined time interval, storing the waveform of the reference electrical signal, and storing the waveform of the electrical signal when position detection is being performed.

13. The control method for a touch panel input device according to claim 12, wherein said process of waveform correction comprises the step of extracting two data points within a data sequence that are the closest to the threshold level and other data points that are adjacent to the two data points, and generating an approximation in accordance with the extracted data.

14. The control method for a touch panel input device according to claim 13, wherein said extraction step comprises the differences between two closest ones of the data points and the threshold level, wherein a data point that is adjacent to the data point having the smaller difference comprises the other data point.

15. The control methods for a touch panel input device according to claim 11, wherein said position calculation step determines a mid-point between two intersections of the corrected waveform and the threshold level, and wherein the mid-point is contact position of the object on panel.

16. An electronic messaging board comprising:

a writing surface; and a touch panel input device disposed on said writing surface comprising:

a panel capable of propagating surface acoustic waves and in which surface acoustic wave attenuation is caused by a object in contact with said panel;

emission circuit means for outputting a surface acoustic wave drive;

an emission transducer for emitting surface acoustic waves in said panel in accordance with the surface wave drive outputted from said emission circuit means;

a reception transducer for receiving surface acoustic waves in said panel and for outputting a received acoustic signal; and reception circuit means for receiving the received acoustic wave signal from said reception transducer to detect a position at which the received acoustic wave is attenuated as indicative of a position that the object contacts said panel; and controller means for controlling said emission circuit and said reception circuit means, comprising:

computing means for computing a width of the contact by the object on said panel in accordance with a waveform detected by said reception circuit means, and judging means for distinguishing a type of object in contact based on the width obtained by said computing means.

17. A display system comprising:

projecting means for projecting an image;

a touch panel input device arranged thereon comprising:

a panel capable of propagating surface acoustic waves and in which surface acoustic wave attenuation is caused by an object in contact with said panel;

emission circuit means for outputting a surface acoustic wave drive;

an emission transducer for emitting surface acoustic waves in said panel in accordance with the surface wave drive outputted from said emission circuit means;

a reception transducer for receiving surface acoustic waves in said panel and for outputting a received acoustic signal; and reception circuit means for receiving the received acoustic wave signal from said reception transducer to detect a position at which the received acoustic wave is attenuated as indicative of a position that the object contacts said panel;

controller means for controlling said emission circuit and said reception circuit means, comprising:

computing means for computing a width of the contact by the object on said panel in accordance with a waveform detected by said reception circuit means, and judging means for distinguishing a type of object in contact based on the width obtained by said computing means; and controller means responsive to said touch panel for displaying the image on said projection means.

18. An overhead projector system comprising:

an overhead projector;

a touch panel input device comprising:

a panel capable of propagating surface acoustic waves and in which surface acoustic wave attenuation is caused by a object in contact with said panel;

emission circuit means for outputting a surface acoustic wave drive;

an emission transducer for emitting surface acoustic waves in said panel in accordance with the surface wave drive outputted from said emission circuit means;

a reception transducer for receiving surface acoustic waves in said panel and for outputting a received acoustic signal; and reception circuit means for receiving the received acoustic wave signal from said reception transducer to detect a position at which the received acoustic wave is attenuated as indicative of a position that the object contacts said panel; and controller means for controlling said emission circuit and said reception circuit means, comprising:

computing means for computing a width of the contact by the object on said panel in accordance with a waveform detected by said reception circuit means, and judging means for distinguishing a type of object in contact based on the width obtained by said computing means;

controller responsive to said touch panel for displaying an image on said projection system.

19. A touch panel input device comprising:

a panel having a surface capable of propagating surface acoustic waves, such that a touch of a region on the surface by a touch input device causes perturbation of at least a partial absorption of energy of a surface wave propagating through the region of the touch;

surface acoustic wave scanning means for scanning said surface with a timed succession of surface acoustic waves directed along parallel paths across said surface in at least one predetermined first direction;

receiving means for receiving the surface acoustic waves and for conveying the received waves into an electrical signal having an amplitude variation indicative of an energy absorption state at said parallel paths; and signal processing means for detecting a position of the touch of said surface in a second direction substantially perpendicular to the first direction, in accordance with the electrical signal having the amplitude variation, said signal processing means comprises:

comparison means for deriving, as an attenuation waveform, an amplitude difference between a reference electric signal obtained from said receiving means when the panel is not touched and the electric signal obtained from said receiving means when the panel is touched, threshold means for comparing the attenuation waveform with a predetermined threshold level, intersection detection means responsive to said threshold means for detecting intersections between said attenuation waveform and said threshold level, and calculating means responsive to said intersection detection means for calculating a point of time intermediate between the intersections as being representative of the position of the touch.

20. The device of claim 19, wherein said receiving means comprises sampling means for sampling the electrical signal at equidistant sampling points to obtain a sequence of samples each representing the energy absorption state at a respective one of said paths.

21. The device of claim 20, further comprising means for converting each sample into a digital value.

22. The device of claim 19, further comprising:

linearization means for linearizing those parts of the attenuation waveform intersecting said threshold value:

wherein the point of time is calculated based on the intersections between the linearized attenuation waveform and the threshold level.

23. The device of claim 22, wherein said comparison means is adapted to calculate, as the attenuation waveform, for each of the sampling points a difference between a reference sample obtained from said receiving means when the panel is not touched and the corresponding sample obtained from said receiving means when the panel is touched, to obtain a sequence of attenuation values.

24. The device of claim 23, wherein said comparison means calculates a sequence of normalized attenuation values by forming for each sampling point a difference between the sample and the corresponding reference sample and dividing the difference by the reference sample.

25. The device of claim 23, wherein said linearization means comprises:

comparing means for comparing each of the attenuation values with the threshold level, finding means for finding at least two groups of three successive sampling points, each group including a pair of successive sampling points of which the attenuation value at one sampling point is smaller and that at the other is greater than said threshold level, and second calculating means for calculating, based on the attenuation values corresponding to each of the groups of sampling points, respective approximation curve segments.

26. The device of claim 25, wherein the sampling point next to that one of the pair of sampling points at which the attenuation value is nearer to the threshold level than that of the other of the pair is selected as the third sampling point in a group.

27. The device of claim 19, wherein the mid-point between said intersections is detected as being representative of said position of a touch.

28. The device of claim 19, further comprising:

detection means for detecting, based on the interval between two successive intersections between the attenuation waveform and the threshold level the width, in the second direction, of a touch of said surface, and distinguishing means responsive to the detected width for distinguishing from each other a plurality of touch input devices each having a different contact surface size and for putting out respective operation mode signals.

29. The device of claim 19, wherein at least one of said touch input means is a touch pen having a contact tip made of a porous member that carries one of a clear and colored quick-drying liquid ink.

30. A method of generating an input signal for an electronic information processing device by means of a touch panel input device having a panel with a surface capable of propagating surface acoustic waves, such that a touch of the surface by a touch input device causes perturbation of at least a partial absorption of energy of a surface wave propagating through the region of the touch, the method comprising the steps of:

(a) obtaining the electric signal under the condition of no touch of the panel, and storing the signal as reference signal, (b) obtaining the electric signal under the condition of touch of said panel, and (c) generating an attenuation waveform representing an amplitude difference between the signal obtained in step (b) and the signal stored in step (a), (d) comparing the attenuation waveform with a specified threshold level, and generating a corrected attenuation waveform by linearizing parts of the attenuation waveform that are near the threshold level, (e) finding two successive intersections of the corrected attenuation waveform with the threshold level, (f) calculating the interval between the start of the signal obtained in step (b) and a point between said two intersections, and (g) outputting the input signal a position signal representing the result obtained in step (f).

31. The method of claim 30, wherein step (a) comprises the step of sampling the electrical signal at equidistant sampling points to obtain a sequence of reference samples each representing the energy absorption state along a respective one of the parallel paths and storing the reference samples, step (b) comprises the step of sampling the electrical signal at the same sampling points as in step (a) to obtain a sequence of samples each representing the energy absorption state along a respective one of said parallel paths and storing the samples, and step (c) comprises the step of generating, as said attenuation waveform, for each of said sampling points the difference between the samples obtained in steps (a) and (b).

32. The method of claim 31, wherein in steps (b) and (c) the samples are quantized and stored as digital values.

33. The method of claim 31, wherein step (d) comprises the step of:

(d1) comparing each of the differences obtained in step (c) with the threshold level;

(d2) finding at least two groups of three successive sampling points, each group including a pair of successive sampling points of which said difference at one sampling point is smaller and that at the other is greater than said threshold level, and (d3) performing the linearizing by calculating, based on the differences corresponding to each of the groups of sampling points, respective approximation curve segments.

34. The method of claim 33, wherein step (d2) comprises the step of taking as the third sampling point in a group the one next to that one of the pair of sampling points at which the difference is nearer to the threshold level than that of the other of the pair.

35. The method of claim 30, wherein step (f) comprises the step of determining an interval between the start of the signal obtained in step (b) and a point corresponding to the mid-point between the two intersections.

36. The method of claim 35, wherein step (c) further comprises the steps of dividing each of the differences by the respective reference sample.

37. The method of claim 36, wherein the interval in each of steps (e) and (f) is determined in units of a fraction of the interval between two successive sampling points.

38. The method of claim 37, wherein step (g) comprises the step of outputting as the input signal a position signal representing the interval between the start of the signal obtained in step (b) and a point between the two intersections, and an operation mode signal representing the interval between the two intersections.

39. An electronic messaging board comprising:

a writing surface; and a touch panel input device comprising:

a panel having a surface capable of propagating surface acoustic waves, such that a touch of a region on the surface by a touch input device causes perturbation of at least a partial absorption of energy of a surface wave propagating through the region of the touch;

surface acoustic wave scanning means for scanning said surface with a timed succession of surface acoustic waves directed along parallel paths across said surface in at least one predetermined first direction;

receiving means for receiving the surface acoustic waves and for converting the received waves into an electrical signal having an amplitude variation indicative of an energy absorption state at said parallel paths; and signal processing means for detecting a position of the touch of said surface in a second direction substantially perpendicular to the first direction, in accordance with the electrical signal having the amplitude variation, said signal processing means comprises:

comparison means for deriving, as an attenuation waveform, an amplitude difference between a reference electric signal obtained from said receiving means when the panel is not touched and the electric signal obtained from said receiving means when the panel is touched, threshold means for comparing the attenuation waveform with a predetermined threshold level, intersection detection means responsive to said threshold means for detecting intersections between said attenuation waveform and said threshold level, and calculating means responsive to said intersection detection means for calculating a point of time intermediate between the intersections as being representative of the position of the touch.

40. A display system comprising:

projecting means for projecting an image; and a touch panel input device comprising:

a panel having a surface capable of propagating surface acoustic waves, such that a touch of a region on the surface by a touch input device causes perturbation of at least a partial absorption of energy of a surface wave propagating through the region of the touch;

surface acoustic wave scanning means for scanning said surface with a timed succession of surface acoustic waves directed along parallel paths across said surface in at least one predetermined first direction;

receiving means for receiving the surface acoustic waves and for converting the received waves into an electrical signal having an amplitude variation indicative of an energy absorption state at said parallel paths; and signal processing means for detecting a position of the touch of said surface in a second direction substantially perpendicular to the first direction, in accordance with the electrical signal having the amplitude variation, said signal processing means comprises:

comparison means for deriving, as an attenuation waveform, an amplitude difference between a reference electric signal obtained from said receiving means when the panel is not touched and the electric signal obtained from said receiving means when the panel is touched, threshold means for comparing the attenuation waveform with a predetermined threshold level, intersection detection means responsive to said threshold means for detecting intersections between said attenuation waveform and said threshold level, and calculating means responsive to said intersection detection means for calculating a point of time intermediate between the intersections as being representative of the position of the touch.

41. An overhead projector system comprising:

an overhead projector; and a touch panel input device comprising:

a panel having a surface capable of propagating surface acoustic waves, such that a touch of a region on the surface by a touch input device causes perturbation of at least a partial absorption of energy of a surface wave propagating through the region of the touch;

surface acoustic wave scanning means for scanning said surface with a timed succession of surface acoustic waves directed along parallel paths across said surface in at least one predetermined first direction;

receiving means for receiving the surface acoustic waves and for converting the received waves into an electrical signal having an amplitude variation indicative of an energy absorption state at said parallel paths; and signal processing means for detecting a position of the touch of said surface in a second direction substantially perpendicular to the first direction, in accordance with the electrical signal having the amplitude variation, said signal processing means comprises:

comparison means for deriving, as an attenuation waveform, an amplitude difference between a reference electric signal obtained from said receiving means when the panel is not touched and the electric signal obtained from said receiving means when the panel is touched, threshold means for comparing the attenuation waveform with a predetermined threshold level, intersection detection means responsive to said threshold means for detecting intersections between said attenuation waveform and said threshold level, and calculating means responsive to said intersection detection means for calculating a point of time intermediate between the intersections as being representative of the position of the touch.

* * * * *

UNITED STATES PATENT AND TRADEMARK OFFICE
CERTIFICATE OF CORRECTION

PATENT NO.     : 5,638,093
DATED          : June 10, 1997
INVENTOR(S)    : Eizo Takahashi, et al.

It is certified that an error appears in the above identified patent and that said Letters Patent is hereby corrected as shown below:

Column 15, line 25, change "convening" to --converting--.

Signed and Sealed this

Second Day of September, 1997

Attest:

BRUCE LEHMAN

*Attesting Officer*     *Commissioner of Patents and Trademarks*